C. M. Daboll.

Drill Stock.

N°. 80,812.   Patented Aug. 11, 1868.

Witnesses
S. N. Piper.
W. P. Hale, Jr.

Inventor
C. M. Daboll
by his attorney
R. H. Eddy

United States Patent Office.

CHARLES M. DABOLL, OF NEW LONDON, CONNECTICUT.

Letters Patent No. 80,812, dated August 11, 1868.

IMPROVEMENT IN DRILL-STOCK.

The Schedule referred to in these Letters Patent and making part of the same.

TO ALL PERSONS TO WHOM THESE PRESENTS MAY COME:

Be it known that I, CHARLES M. DABOLL, in the city and county of New London, and State of Connecticut, have invented a new and useful Improvement in the Breast-Drill Stock; and do hereby declare the same to be fully described in the following specification, and represented in the accompanying drawings, of which—

Figure 1:
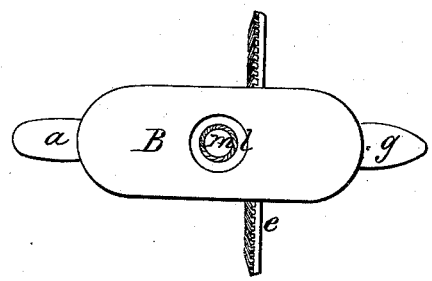

Figure 1 is a top view, and

Figure 2:
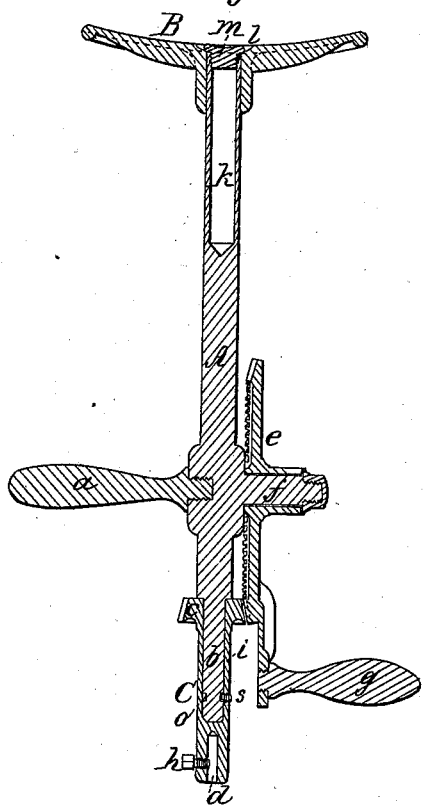

Figure 2 a longitudinal section of my improved breast-drill stock.

In the drawings, A denotes what I term the "stationary spindle" of the stock, it being provided at one end with a curved rest or bearer, B, which, when the implement is in use, is placed against the breast or front of the body of the user, he so holding it by seizing a handle, $a$, which projects at right angles from the spindle A. The said spindle has a journal, $b$, projecting from its other end, and having a diameter less than that of the spindle, such journal being for the support of a tubular shaft or bit-spindle, C, which, at its outer end, is provided with a socket, $d$, to receive the shank of a bit. The spindle C is open at its other end, and has a bevelled pinion, $c$, fixed to it. Furthermore, the journal $b$, which is encompassed by the bit-spindle, or which enters it in manner as represented in the drawings, has a groove, $o$, cut transversely around it to receive the end of a screw, $s$, which is screwed into the bit-spindle, and, with the groove, serves to keep the said spindle in connection with its journal.

A bevelled wheel, $e$, arranged so as to be supported and be capable of being revolved on a journal, $f$, extending from the spindle A, and provided with a crank or handle, $g$, extended from it, as represented in the drawings, engages with the gear or pinion $o$.

A screw, $h$, screwed into the bit-spindle, so as to enter the socket thereof, and arranged in manner as represented, serves to fasten a bit in such socket. I would remark that the end of the journal rests against the end of the bore, $i$, of the bit-spindle.

The spindle A has a chamber, $k$, made lengthwise in it, and opening through the rest B, or into a concave recess, $l$, formed therein, such recess being to receive the entire head of a screw-plug, $m$, which is screwed into the mouth of the chamber $k$. The recess prevents the head of the screw from injuring the breast of a person or being uncomfortable to him while the implement is in use. The chamber in the spindle A is for holding a series of drills or boring-tools of different sizes, such as may be adapted for use in the socket of the spindle C.

By my mode of applying the rotary bit-spindle C to the main spindle A, viz., by a journal to extend from the latter into the former, I obtain a firm and durable seat or shoulder near the pinion, and also a seat at the terminus of the journal, such journal, in consequence of its length, constituting a firm and true support for the drill or bit-shaft to revolve upon.

The drill-chamber or pocket in the stock will be found of much convenience for the purpose for which it is intended.

In using the implement, one hand hold of the handle is to be employed in supporting the bearer against the breast of the user, whose other hand, applied to the crank of the bevelled wheel, is to impart rotary motion to the shaft $c$ by putting the bevel-wheel in revolution on its journal.

I am aware that none of the parts of the apparatus herein described, considered separately, are new, and that, to a very considerable extent, their combination, even, is not new. I do not, therefore, claim the parts separately, nor the combination of them; but What I do claim is—

The arrangement of the several parts, as herein described, the rest B, pocket $k$, and flanged plug $m$, being included in said arrangement.

CHARLES M. DABOLL.

Witnesses:
EDWIN ARCHER,
E. T. BROWN.